Nov. 19, 1963  H. H. BORUP  3,111,206
PANEL ASSEMBLY
Filed Sept. 25, 1958  3 Sheets-Sheet 2

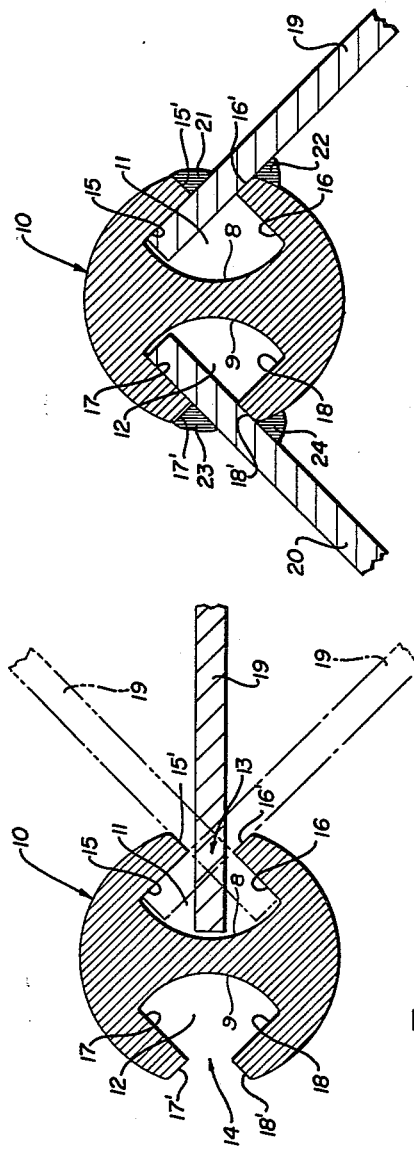

INVENTOR.
Herbert H. Borup
BY James E. Toomey
Attorney

Nov. 19, 1963 H. H. BORUP 3,111,206
PANEL ASSEMBLY
Filed Sept. 25, 1958 3 Sheets-Sheet 3

INVENTOR.
Herbert H. Borup
BY James E. Toomey
Attorney

United States Patent Office 3,111,206
Patented Nov. 19, 1963

3,111,206
PANEL ASSEMBLY
Herbert H. Borup, Concord, Calif., assignor to Kaiser Aluminum & Chemical Corporation, Oakland, Calif., a corporation of Delaware
Filed Sept. 25, 1958, Ser. No. 763,335
4 Claims. (Cl. 189—36)

This invention relates to the joining of the complementary edges of adjacent metal sheets, plates and the like. More particularly, it is concerned with providing a unique member for use in joining the complementary edges of adjacent metal sheets, plates, etc., said member also serving as a jig assembly during the joining of said sheets, plates, etc., whereby a trim fitting and neat appearing joint can be produced irrespective of the irregular or varying curvature of the sheets or plates.

In the fabrication of metal structures, such as boats, wherein surfaces of varying curvature are joined, considerably difficulty has been experienced in obtaining a satisfactory, simple joint which is both trim and pleasing in appearance as well as one which is mechanically strong. Welding of the edges of the metal surfaces gives a satisfactorily strong joint. However, a welded joint will not be trim or neat in appearance unless time is spent in grinding down and smoothing the weld. This can also be an expensive operation. Even after such a grinding operation, the welded joint would still not give a truly trim and neat appearance unless painted, and this would not be satisfactory for many applications, e.g., an aluminum boat hull wherein the natural aluminum surface is desired. Riveting has also been long employed in the joining of metal surfaces. Here again, however, a trim appearing joint is not realized. The overlapping of surfaces and the prominence of the rows of rivet heads all detract from a trim appearance. It is the principal object of this invention, therefore, to provide novel means joining the edges of metal members, such as sheets, plates and the like.

It is a further object of this invention to provide a novel, trim appearing joint structure wherein the edges of the members which are joined have surfaces of varying curvature.

It is a further object of this invention to provide a unique jig-like fixture for use in joining the complementary edges of adjacent metal panels, said fixture having longitudinal parallel grooves or tubular passageways for initially receiving and holding the edges of said panels while at the same time permitting the metal panels to be rotated through an angle defined by said grooves until the proper angular disposition of the panels with respect to each other is effected.

It is an additional object of this invention to provide an elongated element for use in joining the edges of metal panels of varying curvature wherein said element not only functions as a jig during assembly of said panels but also as a permanent part of the final joint between the panels.

It is a further object of this invention to provide an elongated extruded element for use in joining metal panels together by welding wherein the extruded element serves both as a unique jig during assembly of said panels and as a permanent part of the final joint between the panels, said panels also being welded directly to the extruded element.

Other objects and advantages of the invention will be more apparent from a consideration of the following detailed description when taken in conjunction with the appended drawings wherein:

FIGURE 1 is a cross-sectional view of an elongated member embodying the principles of the instant invention, with the edge of a panel member engaged thereby being shown in dotted lines and in different positions;

FIGURE 2 is a view similar to FIGURE 1 but showing metal panels engaged in the grooves and welded in place;

Figure 4:
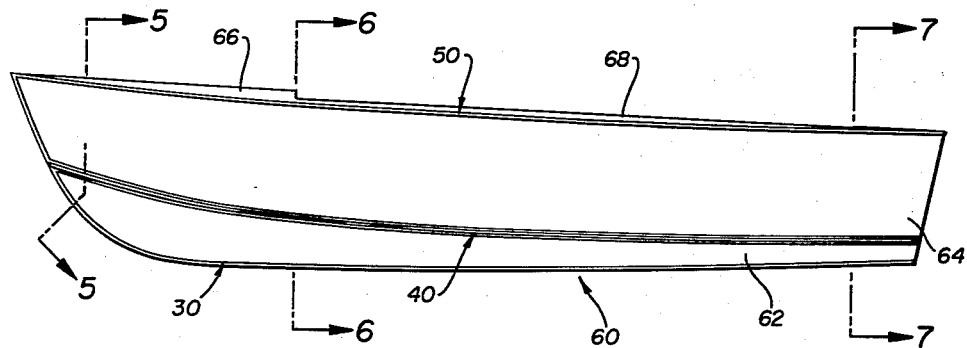
Figure 5:
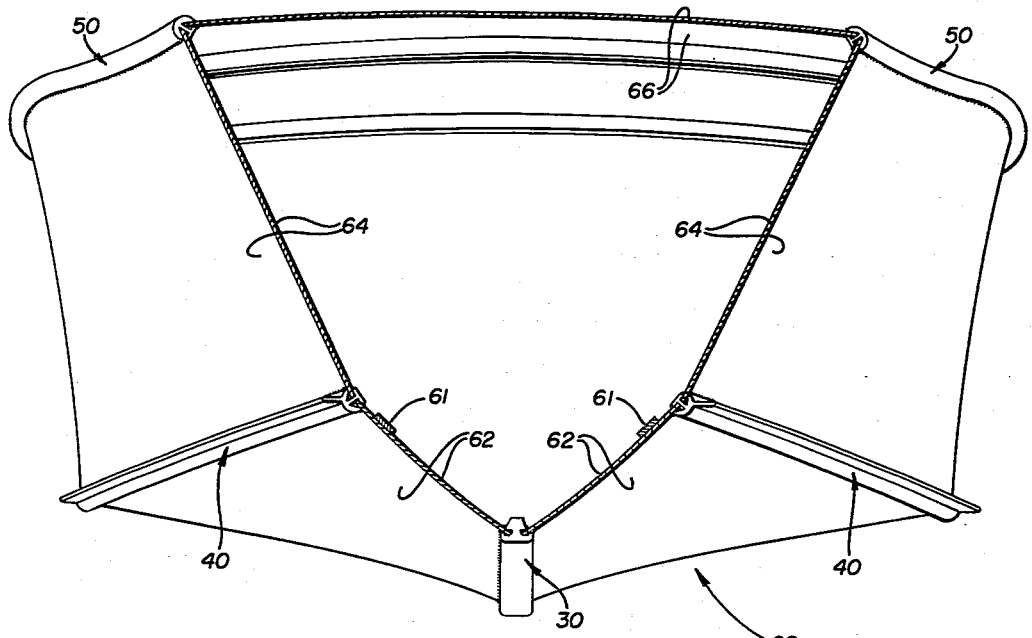
Figure 6:
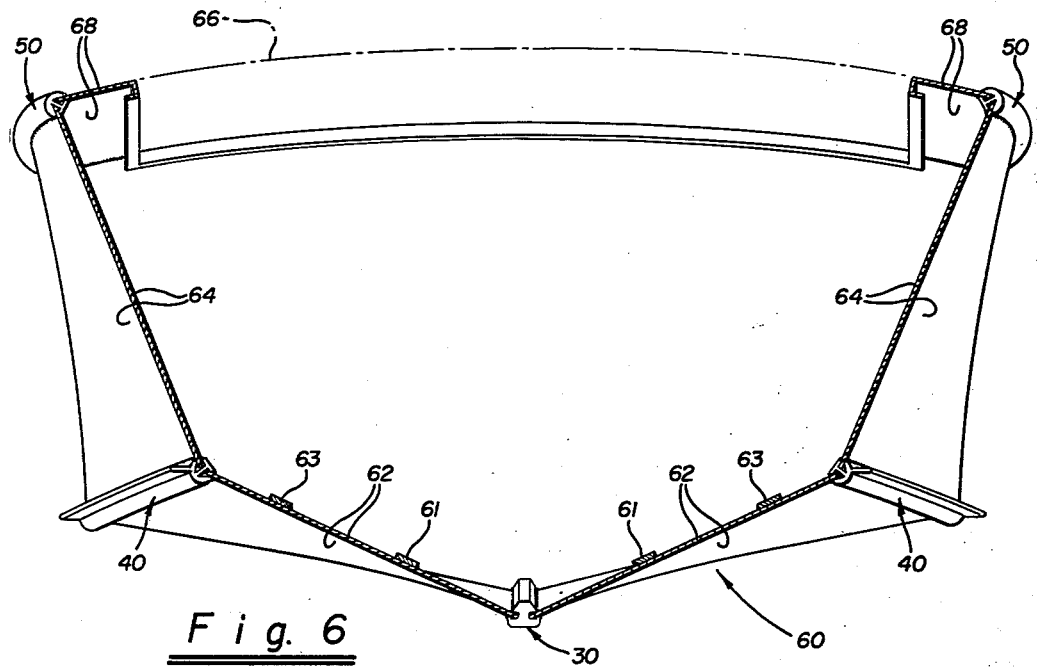
Figure 7:
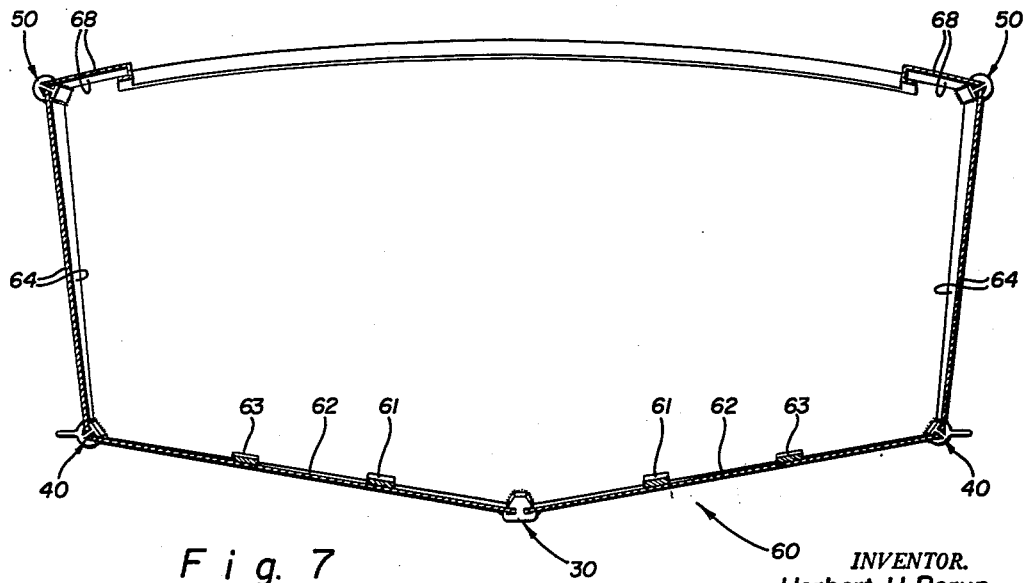

FIGURE 3A, 3B and 3C comprise cross-sectional views of three typical extruded elongated members which embody the principles of the invention and which may be used in a boat hull structure;

FIGURE 4 is a side elevational view of a boat wherein the elongated members depicted in FIGURES 3A, 3B and 3C are employed in the hull structure;

FIGURE 5 is a sectional view of the boat shown in FIGURE 4 when taken along the line 5—5 thereof;

FIGURE 6 is a sectional view of the boat shown in FIGURE 4 when taken along the line 6—6 thereof; and FIGURE 7 is a sectional view of the boat shown in FIGURE 4 when taken along the line 7—7 thereof.

With further reference to the drawings, the jig-type preferably unitary fixture element or member 10 of the instant invention is provided with a plurality of parallel grooves or tube-like passageways 11 and 12 coextensive with the longitudinal dimension of member 10. This member can also be conveniently made in the form of an aluminum extrusion. Tube-like passageways 11 and 12 are further provided with continuous access openings or mouths 13 and 14, respectively, which permit seating of the edges of metal panels and the like, within the passageways.

Diverging inside planar wall surfaces 15 and 16 of tubular passage 11 are disposed adjacent mouth 13 and diverging inside planar wall surfaces 17 and 18 of tubular passage 12 are disposed adjacent mouth 14. These wall surfaces are joined at the bottom of the grooves by wall surfaces 8 and 9. They also merge with contiguous divergent planar wall surfaces 15', 16', 17' and 18' on the outside of mouths 13 and 14.

Since tubular passages or grooves 11 and 12 are substantially identical in structure, a discussion of one will suffice for both. The width of the mouth 13 of passage 11 is slightly larger than the thickness of the metal panel 19 to be joined. Also, the width of the mouth or opening 13 is sufficiently large and the cross-sectional configuration of groove 11 is such as to allow the edge of metal panel 19 disposed in groove or passage 11 to be rotated about the longitudinal axis of the mouth 13, the degree of rotation being governed by the angle included between the respective wall surfaces 15 and 16. For example, the angle of panel rotation could be from 45° to 90°. On the other hand, the width of mouth 13 is also substantially smaller than the largest distance between the diverging wall surfaces 15—16' on either side at mouth 13. The adjustability of the edge of a metal panel within groove 11 is clearly shown in FIGURE 1 wherein three different positions for the edge of metal panel 19 shown in dotted lines is indicated.

In FIGURE 1 where the included angle between surfaces 15 and 16 is 90°, a ⅜ inch width for mouth 13 could accommodate a metal panel of ¼ inch thickness in any angular position with respect to surfaces 15 and 16. These relative measurements would allow for a slight tolerance between the panel and mouth 13 even in those instances where the panel would be abutted against surface 15 or surface 16.

After the panels 19 and 20, as indicated in FIGURE 2, are rotated in grooves or passages 11 and 12 to a predetermined position, they are then welded to fixture 10 to form a corner joint. In FIGURE 2 panels 19 and 20 are shown as being disposed at a 90° angle with respect to each other. However, it is obvious that the panels may be disposed and welded in various positions and at various angles with respect to each other, depending on the results desired.

The weld beads 21, 22, 23 and 24 of the corner joint shown in FIGURE 2 readily blend in with the surface configuration of member 10 thereby giving a trim joint.

The member 10 may be formed by any suitable metal forming process. As indicated above, a particularly desirable method of forming the members 10 of the instant invention is by extruding them from an aluminum billet. The tubular passageways can easily be formed in the member during extruding and no costly machining operations are needed.

The panels 19 and 20 need not be flat. Curved panels are easily joined by member 10. Moreover, member 10 can be so formed as to be curved along its longitudinal dimension. The passages or grooves 11 and 12 of member 10 can also accommodate any ordinary variance of curvature of the metal panels along their longitudinal dimensions. These features of the novel joining member of the instant invention will be more apparent from consideration of the later discussion regarding FIGURES 3A through 7, inclusive.

FIGURES 3A, 3B and 3C show cross sections of various jig-type members 10 which embody the principles of the invention and which are especially designed for use in a boat hull construction.

FIGURE 3A shows an elongated member 30 formed as an aluminum extrusion. Member 30 serves both as the keel for the boat as well as a means for joining various metal panels making up the hull of the boat. FIGURES 3B and 3C depict extruded elongated members 40 and 50, respectively. Members 40 and 50 are utilized for the joining of metal panels at the chine line and sheer line, respectively, of the boat hull. The placement of members 30, 40 and 50 with respect to the over-all boat structure is shown in FIGURE 4.

In FIGURE 4 the side profile of a boat hull 60 is disclosed. It is comprised of bottom or keel panels 62, shin panels 64, deck 66, coamings 68 and elongated members 30, 40 and 50.

The cross-sectional views of the boat hull 60, FIGURES 5, 6, and 7, show in detail how the extruded members 30, 40 and 50 are adapted to accommodate metal panels having varying curvature along the length of the boat hull 60.

FIGURE 5 taken along the line 5—5 of FIGURE 4, which is in the forward part of the boat hull 60, shows the bottom or keel panels 62 joined and welded to extrusion 30, the included angle between the panels 62 being relatively small. Keel panels 62 and shin panels 64 are joined and welded to chine extrusion members 40 with the included angles between panels 62 and panels 64 approaching 180°. Shin panels 64 and the deck member 66 are joined and welded to sheer extrusion members 50.

FIGURE 6 taken along the line 6—6 of FIGURE 4, which is just forward of the mid-section of boat hull 60 shows a much greater included angle between keel panels 62 than is shown in FIGURE 5. Also, portions of keel panels 62 shown in FIGURE 6 have considerable curvature as compared to the portions thereof shown in FIGURE 5. Members 61 and 63 shown in FIGURE 6 are longitudinal channel members for strengthening of the boat hull 60. It is also noted in FIGURE 6 that the included angles between the keel panels 62 and the shin panels 64 are considerably less than the angles shown in FIGURE 5.

FIGURE 7, taken along the line 7—7 of FIGURE 4, near the aft section of boat hull 60 shows keel panels 62 as being disposed at about a 160° angle with respect to each other, which is considerably greater than the angles shown in either FIGURE 5 or FIGURE 6. The included angles between the keel panels 62 and shin panels 64 are about 105°, which is substantially less than the angles shown in either FIGURE 5 or 6.

From a review of FIGURES 4, 5 and 6, therefore, it will be readily observed that members 30, 40 and 50 readily lend themselves to the joining and assembly of structural elements wherein the angles between the elements change along the length of a structure and the curvature of the surfaces of the several structural elements varies. In assembly of the boat hull 60, the elongated extruded members are formed or bent along their lengths in order to conform to the over-all configuration of boat hull 60. All of the various component panel members, such as keel panels 62, shin panels 64, etc., can advantageously be inserted into the tubular passageways of the proper extruded member prior to welding. By means of such an arrangement, the elongated members 30, 40 and 50 act as a jig for the assembly of the panels of the boat hull 60. Prior to the welding operation, the various panels may be adjusted and moved within the tubular passageways of the extruded members 30, 40 and 50. This is an important advantage productionwise because variance in panel measurements and variance in the preformed curvature of metal panels can be compensated for by the tubular passageways of elongated members 30, 40 and 50.

The foregoing description sets forth advantageous embodiments of the invention. It will be understood, however, that modifications can be made therein without departing from the spirit and scope of the invention as defined in the appended claims.

What is claimed is:

1. A panel assembly of the type described comprising a fixture and adjacent metal panels joined and welded to said fixture, said fixture being comprised of an elongated body provided with a plurality of parallel tubular passageways extending along the longitudinal dimension of said body, each of said passageways having an elongated access mouth for receiving the edge of one of said panels, each passageway having planar diverging wall surfaces bounding said mouth, said diverging wall surfaces also merging with other diverging wall surfaces disposed on the outside of said mouth, the width of said mouth also being slightly greater than the thickness of the panels to be joined and substantially smaller than the largest distance between said first-mentioned diverging wall surfaces, the cross-sectional configuration of each passageway also being such as to permit the edge of a panel disposed therein to be angularly adjusted in said passageway prior to the welding of said panel to said fixture, and welds permanently securing the panels to said fixture.

2. A panel assembly of the type described comprising a fixture and adjacent metal panels joined and welded to said fixture, the surfaces of said metal panels also having varying curvatures, said fixture comprising an elongated extruded body provided with parallel internal grooves and each of said grooves having an elongated access mouth for receiving the edge of a metal panel and planar diverging wall surfaces bounding said mouth on either side thereof, said diverging wall surfaces also merging with other diverging wall surfaces disposed on the outside and on either side of said mouth, the width of said mouth being slightly greater than the thickness of the metal panel received therein and smaller than the varying distances between said first-mentioned diverging wall surfaces, the cross-sectional configuration of each groove and the divergence of said first mentioned wall surfaces being such as to allow the edges of metal panels disposed in said grooves to be angularly adjusted in said grooves prior to welding said panels to said fixture, and welds securing said panels to said fixture.

3. A unitary element for use in assembling and joining the complementary edges of adjacent metal panels comprising an elongated body provided with parallel tube-like passageways coextensive with its longitudinal dimension, each of said passageways having a continuous access opening for receiving the edge of a metal panel making up the joint, said openings being bounded by contiguous inwardly and outwardly disposed diverging planar wall surfaces, the width of any opening being slightly greater than the thickness of the metal panel to be received therein and substantially smaller than the largest distance between its bounding divergent wall surfaces, whereby said metal panels can be rotated in each of said passageways about the longitudinal axis of the opening thereof and through an angle defined by said wall surfaces to a predetermined joining position.

4. An element as defined by claim 3 in which the angle of panel rotation is from 45° to 90°.

References Cited in the file of this patent

UNITED STATES PATENTS

| | | |
|---|---|---|
| 958,228 | Conrow | May 17, 1910 |
| 1,688,980 | Miller | Oct. 23, 1928 |
| 1,993,161 | Goebert | Mar. 5, 1935 |
| 2,700,780 | Stein | Feb. 1, 1955 |

FOREIGN PATENTS

| | | |
|---|---|---|
| 110,566 | Sweden | May 9, 1944 |